United States Patent [19]

Yamanis et al.

[11] Patent Number: 4,624,939

[45] Date of Patent: Nov. 25, 1986

[54] CATALYST AND METHOD OF MAKING SAME FOR OXIDATION OF PRIMARY AMINES TO OXIMES BY ELEMENTAL OXYGEN

[75] Inventors: Jean Yamanis, Morris Township, Allegheny County; Emery J. Carlson, Chatham; John N. Armor, Hanover Township, Morris County, all of N.J.

[73] Assignee: Allied Corporation, Morris Township, Allegheny County, N.J.

[21] Appl. No.: 780,857

[22] Filed: Sep. 27, 1985

Related U.S. Application Data

[62] Division of Ser. No. 451,701, Dec. 20, 1982, Pat. No. 4,560,797.

[51] Int. Cl.$^4$ .................... B01J 21/04; B01J 21/06; B01J 23/30; B01J 27/18
[52] U.S. Cl. .................... 502/210; 502/254; 502/323
[58] Field of Search .................... 502/210, 323, 254

[56] References Cited

U.S. PATENT DOCUMENTS 3,900,430 8/1975 Beaty .............................. 502/323 X
3,960,954 6/1976 Russell et al. ....................... 564/267
4,145,316 3/1979 Robson ............................. 502/323 X

*Primary Examiner*—W. J. Shine
*Attorney, Agent, or Firm*—Richard C. Stewart, II; Gerhard H. Fuchs

[57] ABSTRACT

Improved processes for the conversion to oximes by selective oxidation, in the vapor phase, of saturated primary aliphatic or alicyclic amines having 2 to 12 carbon atoms especially cyclohexylamine to cyclohexanone oxime with elemental oxygen, in a reaction zone, in the presence of an effective amount of a catalyst comprising an oxygen-containing tungsten compound and alumina by (1) periodically regenerating the oxygen-containing tungsten catalyst by heating same at about 250° C.–300° C. in the presence of elemental oxygen, or (2) maintaining the temperature of the oxygen-containing tungsten catalyst in a range of about 100° C.–145° C. or (3) employing higher mol fractions of oxygen and of amine in a range of about 0.2–0.4 in the vapor phase are disclosed. An improved method of preparing an oxygen-containing tungsten on an alumina catalyst is also disclosed.

10 Claims, 2 Drawing Figures

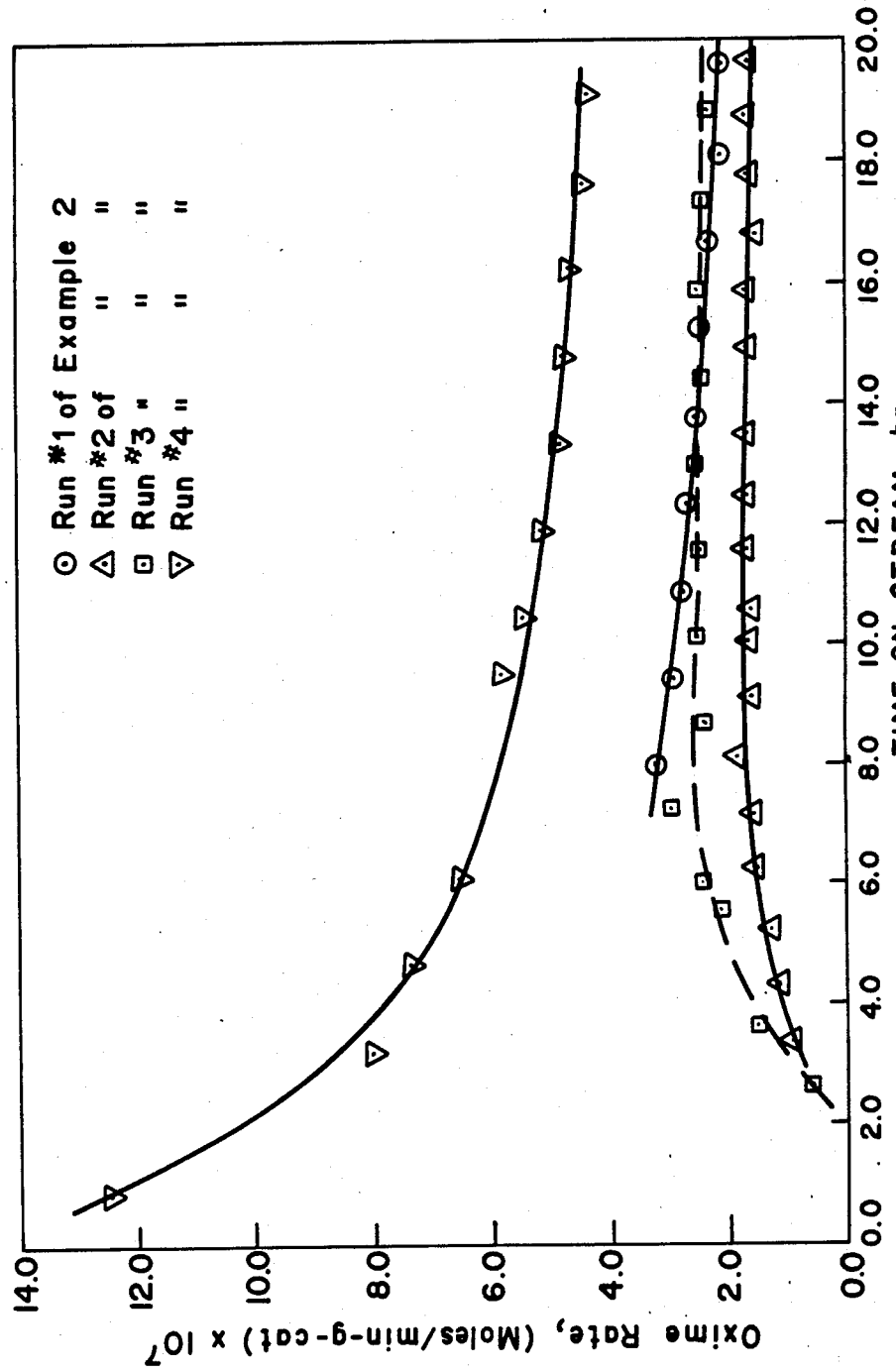
FIG. 1 Oxime Rate vs. Time for $WO_3/Al_2O_3$ Catalysts.

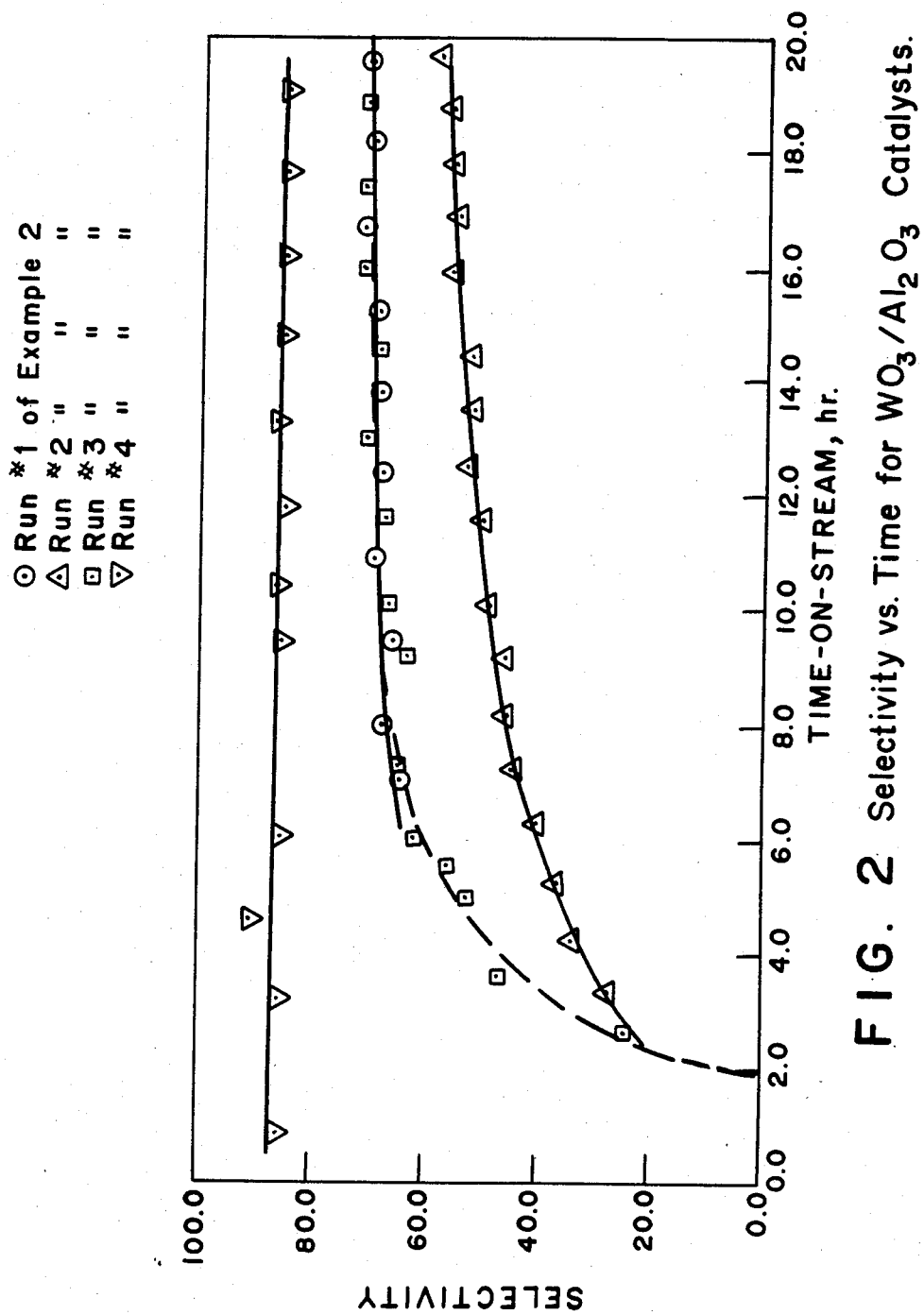
FIG. 2 Selectivity vs. Time for $WO_3/Al_2O_3$ Catalysts.

CATALYST AND METHOD OF MAKING SAME FOR OXIDATION OF PRIMARY AMINES TO OXIMES BY ELEMENTAL OXYGEN

This application is a division of application Ser. No. 451,701, filed Dec. 20, 1982, now U.S. Pat. No. 4,560,797.

BACKGROUND OF THE INVENTION

This invention relates to an improved oxygen-containing tungsten compound on an alumina catalyst useful for production of oximes by selective oxidation, in the vapor phase, of primary aliphatic and alicyclic amines such as cyclohexylamine with elemental oxygen gas. More particularly, this invention relates to an improved oxygen-containing tungsten on an alumina catalyst and method of making, regenerating and using same for selective vapor phase oxidation of saturated primary aliphatic and alicyclic amines such as cyclohexylamine by elemental oxygen to the corresponding oxime.

U.S. Pat. No. 4,337,358 (J. N. Armor) discloses a process for oxidizing primary saturated aliphatic and alicyclic amines having 2 to 12 carbon atoms by elemental oxygen to oximes, especially cyclohexylamine to cyclohexanone oxime, in a vapor phase using a silica gel catalyst, and using temperatures between about 120° C. and 250° C. at atmospheric pressure.

U.S. Pat. No. 4,504,581 filed on an even date herewith discloses a process for production of oximes by contacting, in the vapor phase, saturated primary aliphatic or alicyclic amines of 2 to 12 carbons with elemental oxygen-containing gas in the presence of an effective amount of a catalyst comprising alumina or oxygen-containing tungsten substance on a metal oxide support such as γ-alumina.

A Japanese patent publication of July 11, 1972, No. SHO47-25324, relates to oxidation in the liquid phase, of primary aliphatic and alicyclic amines wherein a tertiary alcohol is present and preferably ammonia gas is present. A catalyst such as tungstic acid, phosphotungstic acid, molybdic acid, selenic acid, or selenious acid is preferably used. Highest conversions obtained in the examples are less than 20% and yields based on oxygen consumed are less than 50%.

U.S. Pat. No. 2,706,204 (K. Kahr) discloses that oximes are obtained by treating a primary amine, in the liquid phase, with hydrogen peroxide in the presence of a salt of an acid of tungsten, molybdenum or uranium as a catalyst.

In catalytic systems, the catalysts eventually lose sufficient activity that it is no longer desirable to continue processing the feed, and thus regeneration and reactivation of the catalyst are necessary to restore the catalyst to its initial activity. In some catalytic systems, regeneration and reactivation are accomplished by taking all reactors off processing to perform the necessary regeneration and reactivation. In swing-type reactor systems, the regeneration and reactivation can be done on an individual reactor basis. In some cases, regeneration and reactivation may require removal of the catalyst from the reactor.

SUMMARY OF THE INVENTION

The present invention provides an improved process for production of oximes by selective oxidation, in the vapor phase, of saturated primary aliphatic or alicyclic amines having 2 to 12 carbon atoms with elemental oxygen, in a reaction zone, in the presence of an effective amount of a catalyst comprising an oxygen-containing tungsten compound and alumina, wherein the initial steady state value of the percent conversion, the initial steady state value of the rate of formation of an oxime, and the initial steady state value of the percent selectivity for formation of an oxime decrease with time. The improvement comprises periodically regenerating said catalyst by heating said catalyst in said reaction zone at a temperature in the range of about 250° C. to about 300° C. in the presence of elemental oxygen for a time sufficient to produce a catalyst comprising an oxygen-containing tungsten compound and alumina that gives rise to a new steady state value of the percent conversion, a new steady state value of the rate of formation of an oxime, and a new steady state value of the percent selectivity for formation of an oxime at least equivalent to the initial steady state values.

The present invention also provides an improved process for the production of oximes by the selective oxidation, in the vapor phase, of saturated primary aliphatic and alicyclic amines having 2 to 12 carbon atoms with elemental oxygen in the presence of an effective amount of a catalyst comprising an oxygen-containing tungsten compound and an alumina support in a reaction zone at elevated temperatures. The improvement comprises maintaining the temperature of the said catalyst in the range of about 100° C. to about 145° C. to suppress the rate of decomposition of oximes and thereby to improve the yield of oximes.

A further improvement in the catalyzed oxidation process comprises employing higher concentrations of both primary amine and elemental oxygen in the range of about 0.2 to about 0.4 mole fraction of the vapor phase thereby effecting higher rates of formation of oxime in smaller reaction zones.

The present invention still further provides an improved method for the preparation of a catalyst comprising an oxygen-containing tungsten compound and an alumina aquagel for oxidation of saturated primary aliphatic or alicyclic amines having 2 to 12 carbon atoms to oximes comprising:

(a) contacting at least about 1.0 to about 20.0 times preferably at least about 1.0 to about 5.0 times and more preferably at least about 2.0 to about 2.5 times the stoichiometric amount of water required to form $Al(OH)_3$ with about a stoichiometric amount of a hydrolyzable aluminum compound in the presence of an effective amount of an oxygen-containing tungsten substance for a time sufficient to form an alumina aquagel containing said tungsten substance;

(b) heating said aluminum aquagel in the presence of elemental oxygen at a temperature at least about 400° C. for a time suficient to produce an activated catalyst comprising oxygen-containing tungsten and an alumina aquagel substantially free of carbon. The improved oxygen-containing tungsten on an alumina catalyst so produced is more active, i.e., higher conversion of amine per gram of catalyst and, more selective, i.e., higher selectivity to oxime than commercially available oxygen-containing tungsten on alumina materials.

BRIEF DESCRIPTION OF THE DRAWINGS

FIG. 1 is a plot of the rate of formation of cyclohexanone oxime by selective catalytic oxidation of cyclohexylamine with elemental oxygen vs. time on stream for a commercially available oxygen-containing tungsten on alumina material which was used as a selective oxidation catalyst before and after pretreatment and/or regeneration in accordance with a preferred embodiment of the present invention.

FIG. 2 is a plot of percent selectivity for formation of cyclohexanone oxime by selective catalytic oxidation of a cyclohexyamine with elemental oxygen vs. time on stream for a commercially available oxygen-containing tungsten on alumina material which was used as a selective oxidation catalyst before and after pretreatment and/or regeneration in accordance with a preferred embodiment of the present invention.

DETAILED DESCRIPTION

The present invention provides an improved oxygen-containing tungsten on an alumina catalyst, improved methods of making and using same in the process for the vapor phase selective oxidation of saturated primary aliphatic and alicyclic amines to oximes by elemental oxygen disclosed in U.S. Pat. No. 4,504,681 even date herewith that is hereby incorporated by reference.

The oxygen-containing tungsten on alumina catalyst effects conversion to oximes by selective oxidation, in the vapor phase, of primary saturated aliphatic or alicyclic amines having 2 to 12 carbon atoms with elemental oxygen in a reaction zone. As the service time of said catalyst in the reaction zone increases, the initial steady state value of percent conversion, the initial steady state value of rate of formation of oxime, and the initial steady state value of the percent selectivity for the formation of oxime decrease with time. It was surprisingly discovered that the oxygen-containing tungsten such as ammonium metatungstate, tungstic acid, silicotungstate acid and phosphotungstic acid on alumina catalyst used for selective oxidation of amines may be periodically regenerated by heating the used catalyst in said reaction zone at a temperature in the relatively narrow range of about 250° C. to about 300° C. in the presence of elemental oxygen such as air for a time sufficient to produce a selective oxidation catalyst comprising an oxygen-containing tungsten compound on alumina that gives rise to new steady state values for the percent conversion, for the rate of formation of oxime, and for the percent selectivity for formation of oxime at least equivalent to the initial steady state values. The periodic regeneration of the selective oxidation comprising oxygen-containing tungsten compound on alumina selective oxidation comprising catalyst may be effected at any time when the values of the rate of formation of the oxime and of the percent selectivity for formation of the oxime decrease below the initial steady state values. The preferred regeneration temperature is in the range of about 250° C. to 300° C. Temperatures higher than 300° C. may be employed but regeneration at such higher temperature produce a less active catalyst. Repeated regeneration of the oxygen-containing tungsten compound on alumina catalyst is possible and a regeneration temperature of about 250° C.–300° C. is preferred. The invention also contemplates pretreating the fresh, i.e., unused selective oxidation catalyst comprising an oxygen-containing tungsten compound on alumina in the presence of elemental oxygen such as air, in the reaction zone, at a temperature of 300° C. However, pretreatment of the selective oxidation catalyst with oxygen at 300° C. without regeneration does not produce as active a catalyst as one subjected to regeneration without pretreatment. In addition, pretreatment of fresh selective oxidation catalyst at a temperature above about 300° C. such as about 500° C. produces a less active catalyst (see Table 2, run #2). As a special feature of the regeneration process of the present invention, regeneration may be effected in the same reaction zone as the selective oxidation of the amines by simply passing elemental oxygen in the absence of the amine for a time sufficient to effect regeneration.

While the reaction of the conversion of amine to oxime by the selective oxidation by elemental oxygen in the presence of an oxygen-containing tungsten on alumina catalyst may be effected in the temperature range of about 130° C. to about 230° C., it was surprisingly found that the selectivity to oxime may be increased by maintaining a temperature in the reaction zone in the range of about 100° C. to about 145° C., preferably about 135° C. to 145° C., more preferably about 135° to 140° C. to suppress the rate of decomposition of oximes formed and thereby to improve the yield of oxime.

In U.S. Pat. No. 4,504,681 it is disclosed that the concentration by volume of the amine be between about 0.5 and 6 percent, preferably 3 percent amine and between about 5 percent and 30 percent by volume, preferably about 11 percent oxygen. It is further disclosed in U.S. Pat. No. 4,504,681 that (1) there is little variation in the selectivity to oxime at 3 percent by volume cyclohexalamine as the oxygen levels is varied from about 3 to about 30 volume percent and (2) concentrations by volume of the reactants outside of these ranges are to be avoided in order to minimize the possibility of an explosion. We have surprisingly discovered that when the vapor phase contains about 0.2 to about 0.4 mol fraction of elemental oxygen and of amine, higher oxime reaction rates are observed without explosion. In addition, by employing oxygen and amine concentrations (mol. fraction) in the vapor phase of each about 0.2 to about 0.4, smaller reaction zone volumes may be employed to effect higher rates of formation of oximes. In a preferred embodiment of the present invention, a vapor phase comprising 0.2 to about 0.4 mol fraction of oxygen and of cyclohexylamine, is contacted with the regenerated oxygen-containing tungsten on alumina catalyst, described hereinabove, in a reaction zone, at a temperature in the range of about 135° C. to 145° C., more preferably about 135° C. to 140° C.

The process of the present invention may be effected in the presence of any of the catalysts comprising oxygen-containing tungsten compounds on alumina supports disclosed in U.S. Pat. No. 4,504,681 which is hereby incorporated by reference.

The preferred oxygen-containing tungsten on alumina catalyst in the process of the present invention is formed by the reaction of hydrolyzable alumina alkoxide having 1–10 carbon atoms and ammonium metatungstate (AMT) in water, in the amount of about 0.5 to 18, preferably about 1.8 to 2.3 times the stoichiometric amount of water required to hydrolyze an aluminum alkoxide having 1 to 10 carbons to aluminum hydroxide, followed by drying the aluminum hydroxide so formed at a temperature of above about 125° to remove the alcohol formed by hydrolysis followed by heating the dried oxygen-containing tungsten on aluminum material at a temperature of at least about 400° for a time sufficient to form an activated catalyst comprising an oxygen-containing tungsten compound and an alumina aqua-gel substantially free of carbon. The preferred aluminum alkoxides are aluminum $C_3$–$C_5$ secondary alkoxides. Aluminum secondary butoxide (ASB) is most preferred. The oxygen-containing tungsten on alumina catalyst prepared by the addition of the preferred range of about 1.8 to 2.3 times the stoichiometric amount of water to the preferred aluminum secondary butoxide produced a more active catalyst with a longer catalytic service lifetime and gave rise to a higher percent conversion of amine per gram of catalyst than the oxygen-containing tungsten on alumina catalyst prepared with higher or lower amounts than the preferred amounts of water, as well as commercially-available oxygen-containing tungsten on alumina materials.

For cyclohexylamine, the weight percent of oxygen-containing tungsten substance (basis W) on alumina is not critical and may be conveniently varied from about 3–20% (basis W) on alumina.

In a preferred embodiment of the present invention the preferred oxygen-containing tungsten on alumina catalyst prepared by hydrolysis of the alumina alkoxide in the presence of AMT and water may be used in the reaction zone in the preferred temperature range of about 135° C. to 140° C. with a vapor phase comprising about 0.2 to about 0.4 mol fraction of oxygen and of cyclohexylamine to effect selective oxidation to cyclohexylamine oxime. In addition, it is more preferred to periodically regenerate the used catalyst to improve the rate of formation of oxime and the selectivity to oxime.

General Experimental

The oxidations of cyclohexylamine in the Examples below were carried out in a borosilicate glass tube of about 14 mm outside diameter, containing a glass frit or a plug of quartz wool to hold the catalyst in place or in a stainless steel tube of 9.5 mm outside diameter containing a stainless steel screen to hold the catalyst in place. The glass or stainless steel tube reactor, equipped for downward feed of the reactants in the gas phase in cocurrent flow, was contained inside a tube furnace, electrically heated. As the catalyst bed is made deeper, under otherwise the same conditions, the extent of conversion increases. The depth of the catalyst bed can be varied; typically it can be about 1 to 9 cm in depth. The temperature, measured at the wall of the furnace, was varied from 130° C. to 180° C. The reactor can be operated manually and also automatically using a cam timer to actuate the sampling valves for reactants and products.

Cyclohexylamine was vaporized by passing the gases (inert gas, conveniently helium) and oxygen through a vaporizer maintained at a temperature, specifically 83° C., at which the cyclohexylamine vapor pressure provides 3% by volume of cyclohexylamine in the reaction gases. The oxygen was about 20% and the balance was helium gas. The flow rate of total vapors and gases at atmospheric temperature and pressure was about 21 cm$^3$/min. The reactor was set up for downward flow of the gases through a bed of catalyst, which was 10% WO$_3$ (basis W) on alumina prepared by an incipient wetness technique or in accordance with the procedure of Example 3. The volume of the catalyst bed was 1–4 cm$^3$. On the basis that the heated gaseous reaction mixture approximates a perfect gas, the contact time is calculated at about 12 seconds.

The gaseous reactants and products were analyzed quantitatively on a Hewlett-Packard 5750 gas chromatograph using a stainless steel column containing Carbowax 20M on Teflon ® or Silar 5CP.

EXAMPLE 1

This example illustrates the best mode now contemplated by the inventors for the preparation of the WO$_3$ catalyst on the alumina xerogel support. In a flat-bottomed Pyrex ® dish, there was placed 10.0 g (0.0405 mol) of aluminum sec-butoxide (ASB), a viscous and moisture-sensitive liquid. A solution of 0.31 g ammonium metatungstate, (AMT, 85% WO$_3$) dissolved in 5 ml of water (0.278 mol, 2.29 times the stoichiometric amount of water required to hydrolyze ASB to Al(OH)$_3$) was promptly added to ASB, with manual stirring. Hydrolysis and solidification of the ASB to a granular mass of alumina occurred in a matter of seconds. The temperature of the mass rose to 70°–75° C. as stirring continued. The wet material was aged at ambient conditions for one to two hours and then dried overnight at 100° C.–125° C. to remove the sec-butanol co-product, excess moisture, and any other volatiles. In the same dish the dried material was heated to 400° C. in a muffle furnace for about four hours during which period the alumina and the tungstate were further dehydrated. There was obtained a white, or nearly white granular material having a low bulk density of 0.15 g/cm$^3$, a BET surface area of 460 m$^2$/g, and a pore volume of 1.9 cm$^3$/g. The quantities of starting materials were calculated to give 10 parts of tungsten per 100 parts of dry alumina, equivalent to 12.6 parts of WO$_3$ per 100 parts of dry alumina. The catalyst was used for oxidation of cyclohexylamine to cyclohexanone oxime by O$_2$ at 160° C. in accordance with the procedure of the General Experimental.

In an exactly analogous manner, the volume of water [stoichiometric amount of water required for the hydrolysis of ASB to Al(OH)$_3$] added to 10 g of ASB and 0.31 g of AMT was varied from 0.5 mL [0.229 times the stoichiometric amount] to 40.0 mL (18.29 times the stoichiometric amount). The results are reported in Table 1. The surface properties (bulk density, BET surface area, and pore volume) and the selectivity to oxime and the catalytic life (defined as time required for conversion of cyclohexylamine to fall to less than 10%) varied with the volume of water added to 10 g of ASB and 0.31 g of AMT. The results are summarized in Table 1.

The WO$_3$ on an alumina xerogel catalyst prepared, in the instant Example 1, by the addition of 5.0 mL of water to 10 g of ASB and 0.31 g AMT was observed to have the longest catalytic life (121 hrs) and the highest selectivity to cyclohexanone oxime in the oxidation of cyclohexylamine by elemental oxygen of various oxygen-containing tungsten on alumina catalysts tested. The results of the tests are summarized in Table 1.

TABLE 1

Effect of Water on the Selectivity and Catalyst Life of WO$_3$/Al$_2$O$_3$ Catalysts for Oxidation[a] of CAM[b] to CONE Oxime[c] by O$_2$ at 160° C.

| Catalyst #1 | Vol of H$_2$O (mL)[d] | Y[e] | C[f] | S[g] | Catalytic Life (hrs)[h] |
|---|---|---|---|---|---|
| 1 | 0.5 | 3.3 | 7.3 | 46 | 7 |
| 2 | 1.0 | 4.0 | 11.0 | 37 | 13 |
| 3 | 2.0 | 12.1 | 21.1 | 57 | >23 |
| 4 | 3.0 | 14.4 | 23.5 | 61 | >23 |
| 5 | 4.0 | 15.0 | 21.0 | 73 | >36 |
| 6 | 5.0 | 16.5 | 22.5 | 74 | 121 |
| 7 | 8.0 | 7.7 | 11.6 | 66 | 24 |
| 8 | 10.0 | 8.5 | 12.4 | 69 | 22 |
| 9 | 15.0 | 8.3 | 14.7 | 57 | 17 |
| 10 | 20.0 | 6.8 | 11.1 | 61 | 18 |
| 11 | 40.0 | 8.2 | 14.0 | 58 | 15 |
| 12 | Commercial[i] | 6.2 | 11.1 | 56 | 10 |

TABLE 1-continued

Effect of Water on the Selectivity and
Catalyst Life of $WO_3/Al_2O_3$ Catalysts for
Oxidation[a] of CAM[b] to CONE Oxime[c] by $O_2$ at 160° C.

| Catalyst #1 | Vol of $H_2O$ (mL)[d] | Y[e] | C[f] | S[g] | Catalytic Life (hrs)[h] |
|---|---|---|---|---|---|
| $WO_3/Al_2O_3$ | | | | | |

[a]General Reaction Condition: 2.8–3.2% of CAM (cyclohexylamine); 11% of $O_2$; Total flow rate of 20 cpm (cm³/min) at 160° C. One g of catalyst containing 10 parts of W per 100 parts of dry $Al_2O_3$ (12.6 parts of $WO_3$ per 100 parts of dry $Al_2O_3$).
[b]CAM = cyclohexylamine
[c]CONE oxime = cyclohexanone oxime
[d]Volume of water added to 10 g of Aluminum sec Butoxide (ASB) and 0.31 g of ammonium meta tungstate (AMT)
[e]Y = yield of CONE oxime
[f]C = conversion of CAM
[g]S = Selectivity to CONE oxime
[h]Catalytic Life = time (hrs) for conversion to fall to less than 10%.
[i]Commercial catalyst obtained from Strem Chemical Co., Inc., Cat #74-3110; 1.5 g of catalyst: 10% $WO_3$ on $\gamma\text{-}Al_2O_3$.

EXAMPLE 2

The apparatus and procedure detailed in General Experimental were used to evaluate the effect of pretreatment and regeneration of the catalyst on the rate of formation and % selectivity to a cyclohexanone oxime. The commercial $WO_3/Al_2O_3$ of material obtained from Strem Chemical Co. (listed in Table 1 of Example 1) was used.

The values for the rate of formation of and percent selectivity to cyclohexanone oxime were measured shortly after or several hours after start-up of the reaction. Measurements of the rate of formation and of the percent selectivity were taken periodically through the time on stream. The results are plotted in FIGS. 1 and 2 and are summarized in Table 2. As shown in FIG. 1, the start-up values for the rate of formation slowly decreased with time in runs 1 (pretreatment), 3 (no pretreatment) and run #4 (pretreatment and regeneration), but increased with time in run #2 (pretreatment at 495° C.) to values which were designated as the initial steady state values. As shown in FIG. 2, the start-up values for the percent selectivity for runs #1-3 increased with time, but, in run #4, slowly decreased with time to values which were designated as the initial steady state values.

Examination of the data summarized in FIGS. 1 and 2 and in Table 2, showed that: pretreatment (run #1) of the fresh commercial catalyst with elemental oxygen at 300° C. produced a selective oxidation catalyst having higher initial steady state values of oxime rate and of percent selectivity compared to fresh commercial catalyst pretreated with elemental oxygen at 495° C. in run #2; fresh commercial material used as a selective oxidation catalyst without pretreatment (run #3) produced a selective oxidation catalyst having a lower initial steady state value for oxime rate but a higher initial steady state value for percent selectivity compared to commercial material pretreated with elemental oxygen at 495° C. (run #2); regeneration with elemental oxygen at 250° C. (run #4) of used catalyst obtained from run #2 and having initial steady state value for percent selectivity of 67% produced an improved selective oxidation catalyst having a new steady state value for percent selectivity of 85%; and regeneration of used catalyst can be effected repeatedly (runs #4 and #5) to produce a selective oxidation catalyst having a new steady state value (85%) in runs #4 and #5 for percent selectivity that is higher than the initial steady state value (59% in run #2).

As the service time on stream of the oxygen-containing tungsten compound on alumina catalysts of the present invention was increased beyond the times on stream reported in Table, the initial and new steady state values of rate of formation of oxime, of percent selectivity and of percent conversion slowly decreased in value.

TABLE 2

Effect of Catalyst Regeneration on the Rate of Formation of and % Selectivity to Cylohexanone Oxime

| Run No. | Catalyst | Pretreatment or Regeneration | Time on Stream (hr) | Oxime Rate[a,b] | S[b,c] % |
|---|---|---|---|---|---|
| #1 | Fresh | 300° C./$O_2$[d] | 33 | 3.23–2.00 | 65–72 |
| #2 | Fresh | 495° C./$O_2$[d] | 23 | 0.94–1.54 | 28–59 |
| #3 | Fresh | None | 90 | 2.23–0.96 | 53–67 |
| #4 | From Run #2 | 250° C./$O_2$[e] | 22 | 12.44–4.03 | 86–85 |
| #5 | From Run #4 | 250° C./$O_2$[e] | 18 | — | 88–85 |
| #6 | Fresh | 250° C./$O_2$[d] | 46 | — | 26–73 |

[a]The rate was measured in units of moles/min.g-cat × 10⁷ at 135° C. under the same operating conditions. Total Flow Rate = 31 cm³/min; 3.1% CAM; 2.5% $O_2$.
[b]The first number is the start-up value of S obtained immediately or shortly after start-up; the second value corresponds to the initial steady state value measured at the end of the run.
[c]S = Selectivity calculated from the rates of oxime and amine assuming no other products are formed. However, material deposited on the catalyst, in an unknown amount, would lower the apparent selectivities.
[d]Pretreatment
[e]Regeneration

EXAMPLE 3

The procedure and apparatus detailed in General Experimental were used, except that the temperature and mole fractions of cyclohexylamine (CAM) and of oxygen were varied as shown in Table 3 below. In Run #9, of Table 3 the vapor phase contained 0.3 mole fraction of CAM and of $O_2$ and the fastest reaction rate of cyclohexylamine to oxime was observed.

TABLE 3

Effect of Cyclohexylamine Concentration on Oxime Rate

| Run | Catalyst | Reaction Temp. (°C.) | Cyclohexylamine Feed (Mol Fraction) | Oxime Reaction[a] Rate[b] |
|---|---|---|---|---|
| #7 | Commercial $WO_3/Al_2O_3$[1] | 130 | 0.028 | 2.5 × 10⁻⁷ |
| #8 | Commercial $WO_3/Al_2O_3$[1] | 130 | 0.056 | 5.3 × 10⁻⁷ |
| #9 | $WO_3/Al_2O_3$[2] | 135 | 0.30[c] | 2.1 × 10⁻⁵ |
| #10 | $WO_3/Al_2O_3$[2] | 142 | 0.032[c] | 2.5 × 10⁻⁶ |

[a]Reaction is oxidation of CAM to cyclohexanone oxime.
[b]Units for the rate are mol/min · g-catalyst.
[c]Mol fraction of $O_2$ was 0.3.
[1]Obtained from Strem Chemical Co. - see Footnote i of Table 1.
[2]10% AMT on $\gamma\text{-}Al_2O_3$ prepared by incipient wetness technique.

EXAMPLE 4

The procedure and apparatus detailed hereinabove in General Experimental were employed to evaluate Catalysts #5 and 6 of Table I of Example 1 and to demonstrate that tungsten is a promoter for the oxidation of cyclohexylamine to oxime by elemental oxygen over an alumina catalyst.

TABLE 4

Activity of $WO_3/Al_2O_3$ Formed by Reaction of $H_2O$ with $ASB^a$ and $AMT^b$ in Oxidation of $CAM^c$ by $O_2$ to CONE $OXIME^d$ at 160° C.

| Catalyst[e] | Weight (g) | Y[f] | C[g] | S[h] | Catalyst Life[i] (hrs) |
|---|---|---|---|---|---|
| #5 of Example 1[j] | 1.0 | 15 | 21 | 73 | >36 |
| #5 of Example 1[j] | 0.71 | 12.6 | 18.5 | 68 | >24 |
| #5 of Example 1[j] | 0.4 | 6.6 | 11.3 | 58 | >30 |
| #6 of Example 1[k] | 1.0 | 21 | 33 | 64 | >>32 |
| $Al_2O_3$[l] | 1.0 | 7.7 | 27 | 28 | <<24 |

[a] ASB = Aluminum sec-butoxide
[b] AMT = Ammonium metatungstate
[c] CAM = Cyclohexylamine
[d] CONE OXIME = Cyclohexanone Oxime
[e] General Conditions: 2.8–3.2% CAM; 11% $O_2$; Total Flow Rate was 20 cpm at 160° C.
[f] Y = Yield of CONE oxime
[g] C = Conversion of CAM
[h] S = Selectivity to CONE oxime
[i] Catalyst Life = Time in hours for conversion of CAM to fall to <10%.
[j] $WO_3/Al_2O_3$ (Catalyst #5 of Example 1): 4.0 mL of $H_2O$ added to 10 g of ASB + 0.31 g of AMT.
[k] $WO_3/Al_2O_3$ (Catalyst #6 of Example 1): 5.0 mL of $H_2O$ added to 10 g ASB + 0.31 g of AMT.
[l] $Al_2O_3$ Catalyst w/out added tungstate prepared by addition of 5.0 mL of $H_2O$ to 10 g of ASB.

EXAMPLE 5

The apparatus and procedure detailed in the General Experimental were used, except that cyclohexanone oxime vapors were fed to the reactor at different temperatures under the feed concentrations and contact time identical to Example 1. The results summarized in Tables 5 & 6 hereinbelow demonstrate that temperatures of no more than about 135°–140° C. are optimal for minimization of decomposition of oxime.

TABLE 5

Temperature Effects on Decomposition of Cyclohexanone $Oxime^a$ over $WO_3/Al_2O_3$ Catalyst

| Run # | Catalyst State | Temperature (°C.) | Conversion (%) |
|---|---|---|---|
| 11 | Aged[1] | 140 | 13 |
| 12 | Virgin[2] | 140 | 18 |
| 13 | Virgin[2,3] | 134 | 21[4] |

[a] 2.5% Oxime; Total Flow Rate = 20 $cm^3$/min.
[1] Catalyst #12 of Table 1 of Example 1 aged for >40 hrs; Catalyst mass = 3.07 g; Catalyst volume: 4.0 $cm^3$.
[2] Catalyst #12 of Table 1 of Example 1; Catalyst mass = 1.63 g; Catalyst volume: 2.2 $cm^3$.
[3] Catalyst mass = 1.54 g; Catalyst Volume: 2.1 $cm^3$
[4] Water vapor and $O_2$ present in feed.

TABLE 6

Temperature Effects on Decomposition of Cyclohexanone $Oxime^a$ over 10% $WO_3/Al_2O_3^b$

| Run # | Temperature (°C.) | Conversion (%) | Time (hrs) |
|---|---|---|---|
| 14 | 140 | 10 | 5 |
| 15 | 160 | 15 | 6 |
| 16 | 181 | 22 | 7 |
| 17 | 200 | 30 | 11 |

[a] 1.8% Oxime; Total Flow Rate = 20 $cm^3$/min. (He/$N_2$ mixture)
[b] Catalyst #12 of Table 1 of Example 1; Cat Volume = 2 $cm^3$.

We claim:

1. A method for the preparation of a catalyst comprising an oxygen-containing tungsten compound and an alumina aquagel for oxidation of saturated aliphatic or alicyclic primary amines having 2 to 12 carbon atoms to oximes comprising:

(a) contacting at least about 1.0 to about 20.0 times the stoichiometric amount of water required to form $Al(OH)_3$ with about a stoichiometric amount of a hydrolyzable aluminum compound in the presence of an effective amount of an oxygen-containing tungsten substance for a time sufficient to form an alumina aquagel containing said tungsten substance;

(b) heating said aluminum aquagel in the presence of elemental oxygen at a temperature at least about 400° C. for a time sufficient to produce an activated catalyst comprising an oxygen-containing tungsten compound and an alumina aquagel substantially free of carbon.

2. The method of claim 1 wherein at least about 1.0 to about 5.0 times the stoichiometric amount of water is used.

3. The method of claim 1 wherein at least about 2.0 to about 2.5 times the stoichiometric amount of water is used.

4. The method of claim 1 wherein the tungsten substance is ammonium metatungstate, tungstic acid, silicotungstic acid or phosphotungstic acid.

5. The method of claim 1 wherein the hydrolyzable aluminum compound is an aluminum ($C_1$–$C_{10}$) alkoxide.

6. The method of claim 5 wherein the tungsten substance is ammonium metatungstate.

7. The product of the process of claim 6.

8. The method of claim 1 wherein the hydrolyzable alumina compound is an aluminum ($C_3$–$C_5$) sec-alkoxide.

9. The method of the process of claim 8.

10. The method of claim 1 wherein at least about 2.0 to about 5.0 times the stoichiometric amount of water is used.

* * * * *